US009059965B2

(12) United States Patent
Droux et al.

(10) Patent No.: US 9,059,965 B2
(45) Date of Patent: Jun. 16, 2015

(54) METHOD AND SYSTEM FOR ENFORCING SECURITY POLICIES ON NETWORK TRAFFIC

(75) Inventors: Nicolas G. Droux, San Jose, CA (US); Sunay Tripathi, Palo Alto, CA (US); Eric T. Cheng, San Mateo, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1216 days.

(21) Appl. No.: 12/494,910

(22) Filed: Jun. 30, 2009

(65) Prior Publication Data

US 2010/0333189 A1 Dec. 30, 2010

(51) Int. Cl.
*G06F 9/00* (2006.01)
*H04L 29/06* (2006.01)

(52) U.S. Cl.
CPC .................................. *H04L 63/0227* (2013.01)

(58) Field of Classification Search
USPC ........................................................... 726/13
See application file for complete search history.

(56) References Cited

U.S. PATENT DOCUMENTS

| | | | |
|---|---|---|---|
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,146,431 B2 | 12/2006 | Hipp et al. | |
| 7,177,311 B1 | 2/2007 | Hussain et al. | |
| 7,260,102 B2 | 8/2007 | Mehrvar et al. | |
| 7,313,142 B2 | 12/2007 | Matsuo et al. | |
| 2002/0052972 A1 | 5/2002 | Yim | |
| 2003/0037154 A1 | 2/2003 | Poggio et al. | |
| 2004/0172557 A1* | 9/2004 | Nakae et al. | 713/201 |
| 2005/0135243 A1 | 6/2005 | Lee et al. | |
| 2005/0138620 A1 | 6/2005 | Lewites | |
| 2006/0041667 A1 | 2/2006 | Ahn et al. | |
| 2006/0070066 A1 | 3/2006 | Grobman | |
| 2006/0174324 A1* | 8/2006 | Zur et al. | 726/3 |

(Continued)

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001, (11 Pages).

(Continued)

*Primary Examiner* — William Goodchild
(74) *Attorney, Agent, or Firm* — Osha • Liang LLP

(57) ABSTRACT

A computer readable medium that includes computer readable program code embodied therein. The computer readable medium causes the computer system to receive, by a data link rule enforcer, a packet from a packet source of the packets, and obtain a data link rule applying to a data link. The data link is operatively connected to the packet source, and the data link is associated with a media access control (MAC) address. The computer readable medium further causes the computer system to determine, by the data link rule enforcer, whether the packet complies with the data link rule, and drop, by the data link rule enforcer, the packet when the packet fails to comply with the data link rule.

10 Claims, 6 Drawing Sheets

(56) References Cited

U.S. PATENT DOCUMENTS

2008/0002682 A1* 1/2008 Srinivasan et al. ............ 370/389
2008/0021985 A1* 1/2008 Belgaied et al. .............. 709/221
2008/0151893 A1* 6/2008 Nordmark et al. ............ 370/392

OTHER PUBLICATIONS

Tripathi, S.; "Crossbow: Network Virtualization and Resource Control"; Presentation to Sun Labs Open House; Jun. 1, 2006; (22 pages).
Belgaied, K. et al.; "Crossbow Hardware Resources Management and Virtualization"; Sep. 28, 2007; 14 pages.
Droux, N.; "Crossbow Network Virtualization Architecture"; Aug. 28, 2007; Solaris Core OS, Sun Microsystems, Inc.; 51 pages.
Khare, S.; "VLANs as VNICs"; Solaris Networking, Sun Microsystems, Inc.; Aug. 13, 2007; 9 pages.
Tripathi, S.; "NIC/VNIC/Flows—Bandwidth Control & Fanout", Feb. 24, 2007; (7 Pages).
Droux, N.; "Virtual Switching in Solaris"; Solaris Networking, Sun Microsystems, Inc.; Apr. 2, 2007; 6 pages.
Tripathi, S.; "Crossbow Architectural Document"; Nov. 21, 2006; 19 pages.
Nordmark, E., et al.; "IP Instances Interface Document"; PSARC 2006/366; Dec. 28, 2006; 18 pages.
Nordmark, E.; "IP Instances Design Document"; PSARC 2006/366; Dec. 21, 2006; 38 pages.
Droux, N.; "Crossbow: Network Virtualization and Bandwidth Partitioning"; presented at CHOSUG, Jun. 19, 2007; 23 pages.
Nordmark; E.; "IP Instances—Network Isolation Meets Zones"; presented at SVOSUG, Oct. 26, 2006; 28 pages.
Tripathi, S.; "CrossBow: Network Virtualization and Resource Control"; presented at SVOSUG, Aug. 24, 2006; 27 pages.
Tripathi, S.; "CrossBow: Network Virtualization and Resource Control"; presented at Sun Labs Open House; Jun. 1, 2006; 24 pages.
Tripathi, S.; "Solaris Networking—The Magic Revealed (Part I)"; Sunay Tripathi's Solaris Networking Weblog; Nov. 14, 2005; (22 Pages).

* cited by examiner

METHOD AND SYSTEM FOR ENFORCING SECURITY POLICIES ON NETWORK TRAFFIC

BACKGROUND

Network traffic is transmitted across a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

It is often desirable to monitor packets sent by a sender and packets received by a receiver. For example, the monitoring may be performed to ensure that the sender on a sending computer system is not maliciously sending packets, such as by impersonating another sender. Similarly, the monitoring of a receiving computer system may be to ensure that the receiver is not receiving packets that could maliciously alter the receiving computer system.

SUMMARY

In general, in one aspect, the invention relates to a computer readable medium that includes computer readable program code embodied therein. The computer readable medium causes the computer system to receive, by a data link rule enforcer, a packet from a packet source of the packets, and obtain a data link rule applying to a data link. The data link is operatively connected to the packet source, and is associated with a media access control (MAC) address. The computer readable medium further causes the computer system to determine, by the data link rule enforcer, whether the packet complies with the data link rule, and drop, by the data link rule enforcer, the packet when the packet fails to comply with the data link rule.

In general, in one aspect, the invention relates to a computer readable medium that includes computer readable program code embodied therein. The computer readable medium causes the computer system to receive, by a data link rule enforcer, a packet from a network. The packet specifies a packet destination. The computer readable medium further causes the computer system to obtain a data link rule applying to a data link corresponding to the packet destination. The data link is operatively connected to the packet destination, and is associated with a MAC address. The computer readable medium further causes the computer system to determine, by the data link rule enforcer, whether the packet complies with the data link rule, and drop, by the data link rule enforcer, the packet when the packet fails to comply with the data link rule.

In general, in one aspect, the invention relates to a computer system that includes a processor, a memory, and instructions stored in memory. The instructions cause the processor to receive, by a data link rule enforcer, a packet from a packet source of the packets, and obtain a data link rule applying to a data link. The data link is operatively connected to the packet source, and is associated with a MAC address. The instructions further cause the processor to determine, by the data link rule enforcer, whether the packet complies with the data link rule, and drop, by the data link rule enforcer, the packet when the packet fails to comply with the data link rule. The packet source is a virtual machine or a container.

Other aspects of the invention will be apparent from the following description and the appended claims.

DETAILED DESCRIPTION

Figure 1:
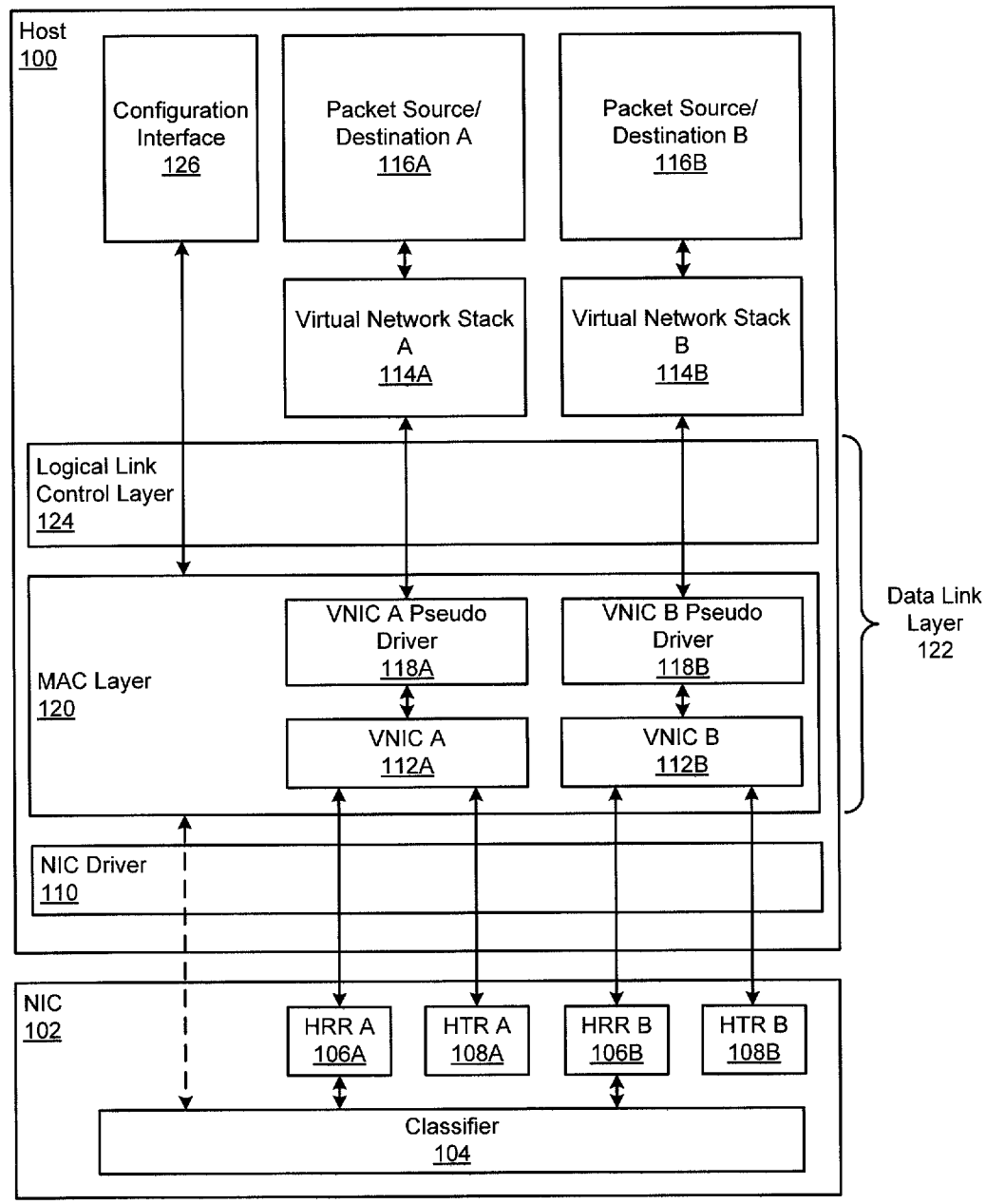
FIGS. 1 and 2 show schematic diagrams of a system in accordance with one or more embodiments of the invention.

Specific embodiments of the invention will now be described in detail with reference to the accompanying FIGs. Like elements in the various FIGs. are denoted by like reference numerals for consistency. Further, the use of "FIG." in the drawings is equivalent to the use of the term "FIG." in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention enforce data link rules at the data link layer of the network communication stack. Specifically, embodiments of the invention monitor and filter packets sent and received by a packet source/destination to ensure that the packets comply with one or more data link rule(s). Packets that do not comply with the data link rule(s) are dropped in accordance with one or more embodiments of the invention.

A data link is a component (physical or virtual) that is registered in the Media Access Control (MAC) layer and associated with at least one MAC address. For example, the data link may be the physical NIC, a link aggregation group, a Virtual Network Interface, a virtual local area network (VLAN), any other component with a MAC address, or a combination thereof.

In one or more embodiments of the invention, the data link rules are defined using link properties associated with all or a subset of data links used to send and receive packets from the packet source/destination. More specifically, a data link rule is defined for all or a subset of data links corresponding to a packet source/destination. For example, if a packet source/destination is connected to a public network and a private network, then the data link rules may apply to only the data links for the public network and not to the data links corresponding to the private network.

In one or more embodiments of the invention, data link rules are defined to enforce security policies. Specifically, data link rules may be defined to ensure that packets sent by a packet source on the host are not malicious (e.g., change the network configuration, impersonate another packet source, or perform other such nepharious acts) and to ensure that packets received by a packet destination on the host are not malicious (e.g., receive confidential network configuration information, receive a multicast message that is not intended for the packet destination, or receive other data not intended for the packet destination).

In one embodiment of the invention, the data link rules are associated with a given data link (or data links) based on the MAC address of the data link(s) for which the data link rule applies. Specifically, the data link rule may directly or indirectly reference a specific MAC address. Data link rules may also indirectly reference a data link being applicable to all data links or all data links having a certain characteristic. For example, the data link rule, without actually identifying the MAC address of the data link, may specify that all packets sent from a data link must specify a source MAC address that corresponds to the MAC address of the data link. As another example, the data link rule may specify that all packets sent on a public network, and therefore all data links that are capable of sending packets on a public network, must conform with the rule. Data link rules applicable to a given data link may be obtained according to the properties of the data link (e.g., MAC address, corresponds to a public network, etc.). For example, when a packet is received for a data link, the data link rules are obtained that apply to the data link (e.g., data link rules that identify the MAC address of the data link, data link rules that apply to all data links, data link rules that apply to data links corresponding to public networks when the data link corresponds to a public network, etc.).

The following are a few examples of data link rules. The following are for example purposes only and not intended to limit the scope of the invention. Specifically, other types of data link rules may be defined without departing from the scope of the invention. In an example, a data link rule may require that the Media Access Control (MAC) address of the Virtual Network Interface Card (VNIC) associated with the packet source/destination matches the MAC address specified in the packet. Such a data link rule may assist in assuring that the packet source/destination is not impersonating another packet source/destination.

As another example, the data link rule may be defined to block control messages from being sent or received by a packet source/destination. In one or more embodiments of the invention, a control message includes information about the topology of the network or specifies a change in the topology of the network. The data link rule may specify protocols used to send and receive packets. For example, a data link rule may indicate that packets corresponding to control messages using protocols for configuring the network are blocked. In another example, the data link rule may block control messages based on a value of a multicast address in the control message.

In another example, the data link rule may be based on the Internet Protocol (IP) address of the packet source/destination. In the example, the data link rule may specify that only packets sent from the packet source having an IP address matching the IP address of the packet source are allowed.

Another example of a data link rule may specify that packets received from a network and corresponding to unsolicited address resolution protocol (ARP) messages are dropped. An ARP message is a request to match an IP address with a MAC address of a device used to receive data for the IP address.

In one or more embodiments of the invention, the data link rules are enforced by a data link rule enforcer. In one or more embodiments of the invention, the data link rule enforcer includes functionality to enforce the data link rules for a data link. In one or more embodiments of the invention, the data link rule includes a MAC address of the data link to which the rule applies. In one or more embodiments of the invention, data from the data link is divided into frames. Additionally, in one or more embodiments of the invention, the data link does not perform network layer or transport layer processing.

FIG. 1 shows a schematic diagram of a system in accordance with one or more embodiments of the invention. As shown in FIG. 1, the system includes a host (100) operatively connected to a network interface card (NIC) (102). The NIC (102) provides an interface between the host (100) and a network (not shown) (e.g., a local area network, a wide area network, a wireless network, etc.). More specifically, the NIC (102) includes an NI (i.e., the hardware on the NIC used to interface with the network). For example, the NI may correspond to an RJ-45 connector, a wireless antenna, etc. The packets received by the NI are then forwarded to other components (not shown) on the NIC (102) for processing, etc.

In one embodiment of the invention, the NIC (102) includes a classifier (104), one or more hardware receive rings (HRRs) (106A, 106B), and one or more hardware transmit rings (HTRs) (108A, 108B). In one embodiment of the invention, the HRRs (106A, 106B) correspond to portions of memory used to store, temporarily, the received packets. Similarly, the HTRs (108A, 108B) correspond to portions of memory used to store packets to send on the network. In one or more embodiments of the invention, the HRRs (106A, 106B) and HTRs (108A, 108B) are implemented as ring buffers. A ring buffer is a temporary data structure in which the individual data elements in the ring buffer are arranged in a circle. Specifically, ring buffers do not have ending data elements.

In one embodiment of the invention, the classifier (104) is configured to analyze the incoming network traffic, typically in the form of packets, received from the network (not shown). Those skilled in the art will appreciate that while the NI is described above as being part of the NIC (102), the NI may be implemented using other hardware configurations (i.e., in hardware other than a "card").

In one embodiment of the invention, analyzing the packets by the classifier (104) includes analyzing one or more fields in each of the packets to determine to which of the HRRs (106A, 106B) the packets are forwarded. As an alternative, the classifier (104) may use the contents of one or more fields in each packet as an index into a data structure that includes information necessary to determine to which HRR (106A, 106B) that packet is forwarded. The classifier (104) may be implemented entirely in hardware (i.e., the classifier (104) may be a separate microprocessor embedded on the NIC (102)). In such scenario, the classifier is a hardware classifier on the NIC (102). Alternatively, the classifier (104) may be a software classifier implemented in software stored in memory (e.g., firmware, etc.) on the NIC (102) and executed by a microprocessor on the NIC (102). The classifier (104) may be configured to drop packets based on the data link rules defined for the HRRs (106A, 106B).

In one or more embodiments of the invention, the NIC (102) includes a data link rule enforcer (not shown). The data link rule enforcer on the NIC (102) may correspond to a hardware or software component on the NIC (102) that enforces the data link rules. In one or more embodiments of the invention, the data link rule enforcer enforces the rules based on the HRR (106A, 106B) and HTR (108A, 108B) in which the packets are placed. In one or more embodiments of the invention, the data link rules enforced by the data link rule enforcer on the NIC (102) are stored on the NIC (102).

As discussed above, the NIC (102) is connected to the host (100). In one embodiment of the invention, the host (100) may include a NIC driver (110), one or more virtual NICs (VNIC) (112A, 112B), one or more virtual network stack(s) (VNS) (114A, 114B), and one or more packet sources/destinations (116A, 116B). Each of these components is described below.

In one embodiment of the invention, the NIC driver (110) provides an interface between the HRRs (106A, 106B) and the host (100). More specifically, the NIC driver (110)

exposes the HRRs (106A, 106B) and the HTRs (108A, 108B) to the host (100). Although not shown in FIG. 1, the host (100) may be connected to multiple physical NICs. In such a scenario, each physical NIC (102) may have a corresponding NIC driver on the host (100). An aggregation driver (not shown) may be used to manage the data from the multiple physical NICs.

In one embodiment of the invention, each VNIC (112A, 112B) is located within the Media Access Control (MAC) layer (120) of the host (100). In one embodiment of the invention, each of the VNICs (112A, 112B) is associated with one or more HRRs (106A, 106B) and one or more HTRs (108A, 108B). Further, an HRR (106A, 106B) and an HTR (108A, 108B) may be associated with more than one VNIC (112A, 112B). For example, each of multiple HRRs on the NIC (102) may correspond to a disjoint set of multiple VNICs on the host (100). In embodiments in which an HRR is associated with more than one VNIC, the host may include a software classifier (not shown). The software classifier on the host may include functionality similar to the classifier on the NIC (102). Specifically, the software classifier may include functionality to analyze a packet to identify a VNIC for receiving the packet and place the packet in a queue corresponding to the VNIC.

The VNICs (112A, 112B) provide an abstraction layer between the NIC (102) and the various packet sources/destinations (116A, 116B) (discussed below). More specifically, each VNIC (112A, 112B) operates like a NIC (102) for a single packet source/destination. For example, in one embodiment of the invention, each VNIC (112A, 112B) is associated with one or more Internet Protocol (IP) addresses, one or more ports, and configured to handle one or more protocol types. Thus, while the host (100) may be operatively connected to a single NIC (102), packet sources/destinations (116A, 116B) and other applications executing in the user level on the host (100) operate as if the host (100) is bound to multiple NICs. Said another way, each VNIC (112A, 112B) operates as a separate network device connected to the network.

In one or more embodiments of the invention, each VNIC (112A, 112B) is within the MAC layer (120) of the data link layer (122). The data link layer (122) includes functionality transfer data between network entities and to detect and possibly correct errors that may occur in the physical layer (i.e., on data received by the NIC (102)). The data link layer (122) includes a Logical Link Control (LLC) layer (124) and the MAC layer (120). The LLC layer (124) provides multiplexing and flow control mechanisms. The MAC layer (120) allows multiple hosts to connect to the same network by having separate MAC addresses. Each VNIC performs MAC layer processing of packets. Specifically, each VNIC (112A, 112B) has a corresponding MAC address and performs MAC layer addressing. In one or more embodiments of the invention, each VNIC (112A, 112B) is a data link rule enforcer for packets processed by the VNIC. Specifically, each VNIC (112A, 112B) includes functionality to determine whether the packet complies with the data link rules. Alternatively, the MAC layer (120) may include a data link rule enforcer, which is used by all data links in the MAC layer (120).

In one or more embodiments of the invention, the packet source/destination(s) (116A, 116B) corresponds to any process or group of processes executing on the host that sends and receives network traffic. For example, the packet source/destinations (116A, 116B) include, but are not limited to, containers, services (e.g., web server), and virtual machines.

In one embodiment of the invention, a container is a virtualized environment that does not have a separate operating system from the host. Rather, the execution environment of applications in the container is a partition of the host's operating system. Therefore, the execution environment of applications in two different containers executing on the same host is the same single instance of the operating system on the host. A container provides an isolated execution environment in order to have the same protections of separate machines on a single instance of an operating system. Specifically, each container has a security boundary surrounding it that prevents a process in one container from interacting with or observing processes in other containers. In one embodiment of the invention, a virtual machine is a virtualized environment that has a separate operating system. Specifically, the execution environments of applications executing in different virtual machines are different instances of one or more operating systems.

Returning to FIG. 1, each of the VNICs (112A, 112B) is operatively connected to a corresponding VNS (114A, 114B) via a VNIC pseudo driver (118A, 118B). A VNIC pseudo driver (118A, 118B) provides an interface to the corresponding VNIC (112A, 112B). In one or more embodiments of the invention, a VNS (114A, 114B) is a network stack that is virtualized to account for multiple network stacks operating in the same execution environment. In one embodiment of the invention, a network stack includes functionality to process packets in accordance with various protocols used to send and receive packets (e.g., Transmission Communication Protocol (TCP), Internet Protocol (IP), User Datagram Protocol (UDP), etc.). By having separate network stacks for each VNIC, embodiments of the invention compartmentalize the packets of different packet source/destinations into individual structures thereby providing greater security in accordance with one or more embodiments of the invention. Each network stack may also include functionality to send and receive packets from an associated VNIC (112A, 112B). Further, each network stack may also include functionality to send and receive packets from an associated packet source/destination (116A, 116B).

In one embodiment of the invention, each virtual network stack includes network layer and transport layer functionality. In one embodiment of the invention, network layer functionality corresponds to functionality to manage packet addressing and delivery on a network (e.g., functionality to support IP, ARP, Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

In one embodiment of the invention, the NIC driver (110), the VNICs (112A, 112B), and the VNSs (114A, 114B) each use memory located on the host (100) to transfer packets. In one embodiment of the invention, the NIC driver (110), the VNICs (112A, 112B), and the VNSs (114A, 114B) use the kernel level memory (not shown), located on the host (100). The kernel level memory corresponds to a section of memory located on the host (100) for use by the kernel and other processes executing in the kernel level.

In one embodiment of the invention, packet sources/destinations (116A, 116B) and other user level applications use memory located on the host (100), referred to as user level memory (not shown). In one embodiment of the invention, the user level memory corresponds to a section of memory located on the host (100) for use by processes in the user level.

In one or more embodiments of the invention, the host (100) includes a configuration interface (126). In one or more embodiments of the invention, the configuration interface (126) is an application programming interface or user interface for defining data link rules. Specifically, the configuration interface provides an interface for specifying data link rules for one or more data links associated with a packet source/destination (116A, 116B). The configuration interface includes functionality to transmit the data link rules to the data link rule enforcer for enforcement. Specifically, the configuration interface (126) includes functionality to interface with the data link rule enforcer.

In one embodiment of the invention, the configuration interface (126) includes functionality to transmit the data link rules to a data link rule enforcer on the NIC (102) through a MAC layer (120) located on the host (100). Alternatively, the configuration interface (126) configures the data link rule enforcer on the NIC (102) directly, without passing through the MAC layer (120). As another alternative, the configuration interface (126) may include functionality to transmit data link rules to a data link rule enforcer on the host (100).

Figure 2:
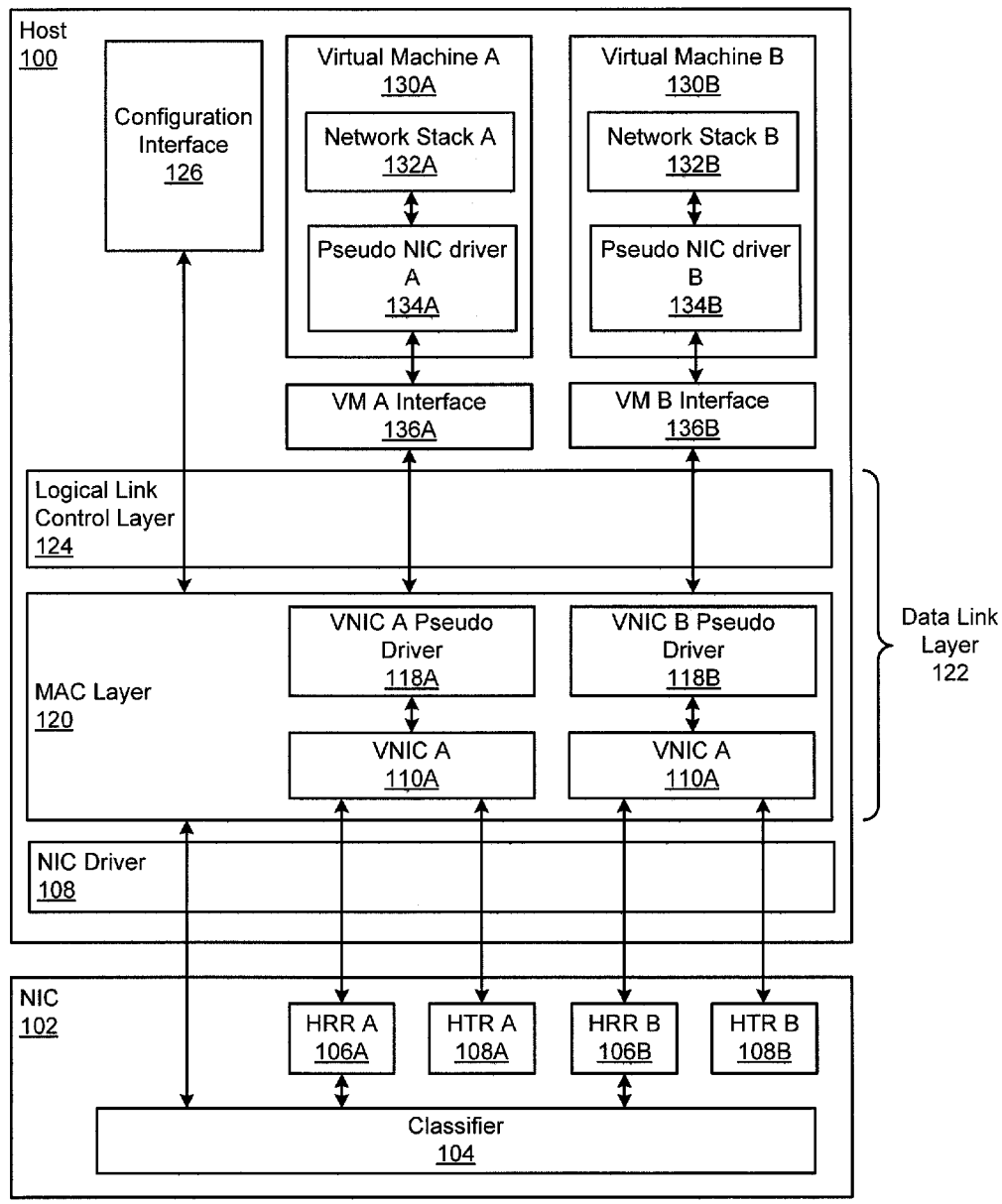

FIG. 2 shows a schematic diagram of the system when the packet sources/destinations (116A, 116B in FIG. 1) are virtual machines (130A, 130B). As discussed above, each virtual machine (130A, 130B) executes a distinct operating system instance in accordance with one or more embodiments of the invention. The operating system instances may correspond to the same operating system or a different operating system. To the operating system instances executing in the virtual machine (130A, 130B), the virtual machine appears as a physical machine. Thus, the operating system instance includes a network stack (132A, 132B) and a pseudo NIC driver (134A, 134B). The pseudo NIC driver (134A, 134B) appears to the operating system instance as a standard driver. The pseudo NIC driver (134A, 134B) includes functionality to communicate with the VNIC via a virtual machine interface (VM interface) (136A, 136B) and the VNIC pseudo driver (118A, 118B). A VM interface (136A, 136B) allows for an operating system or kernel in a control domain of the host (100) to provide services to the virtual machine(s) (130A, 130B).

Figure 3:
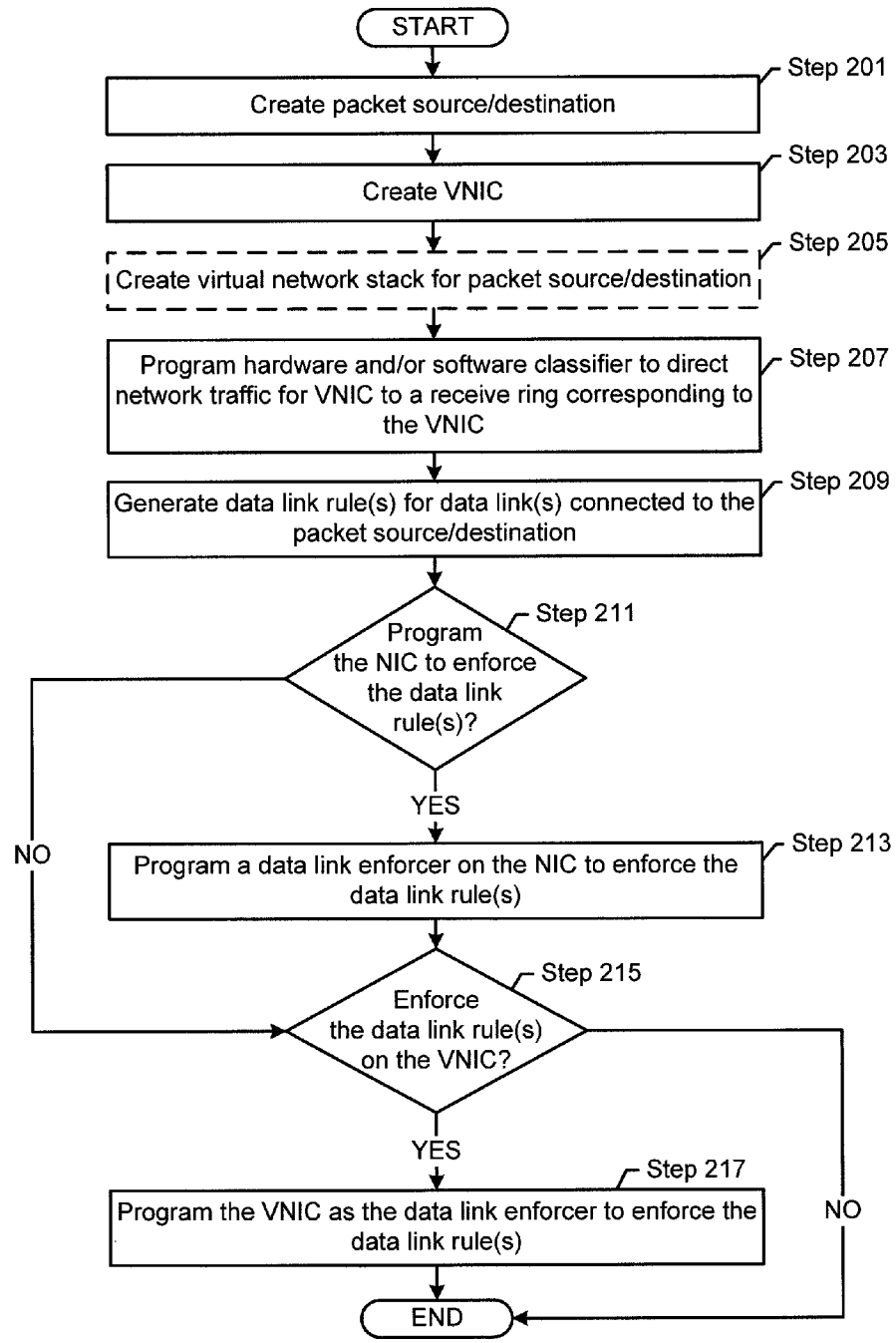
FIGS. 3-5 show flowcharts in accordance with one or more embodiments of the invention.
Figure 4:
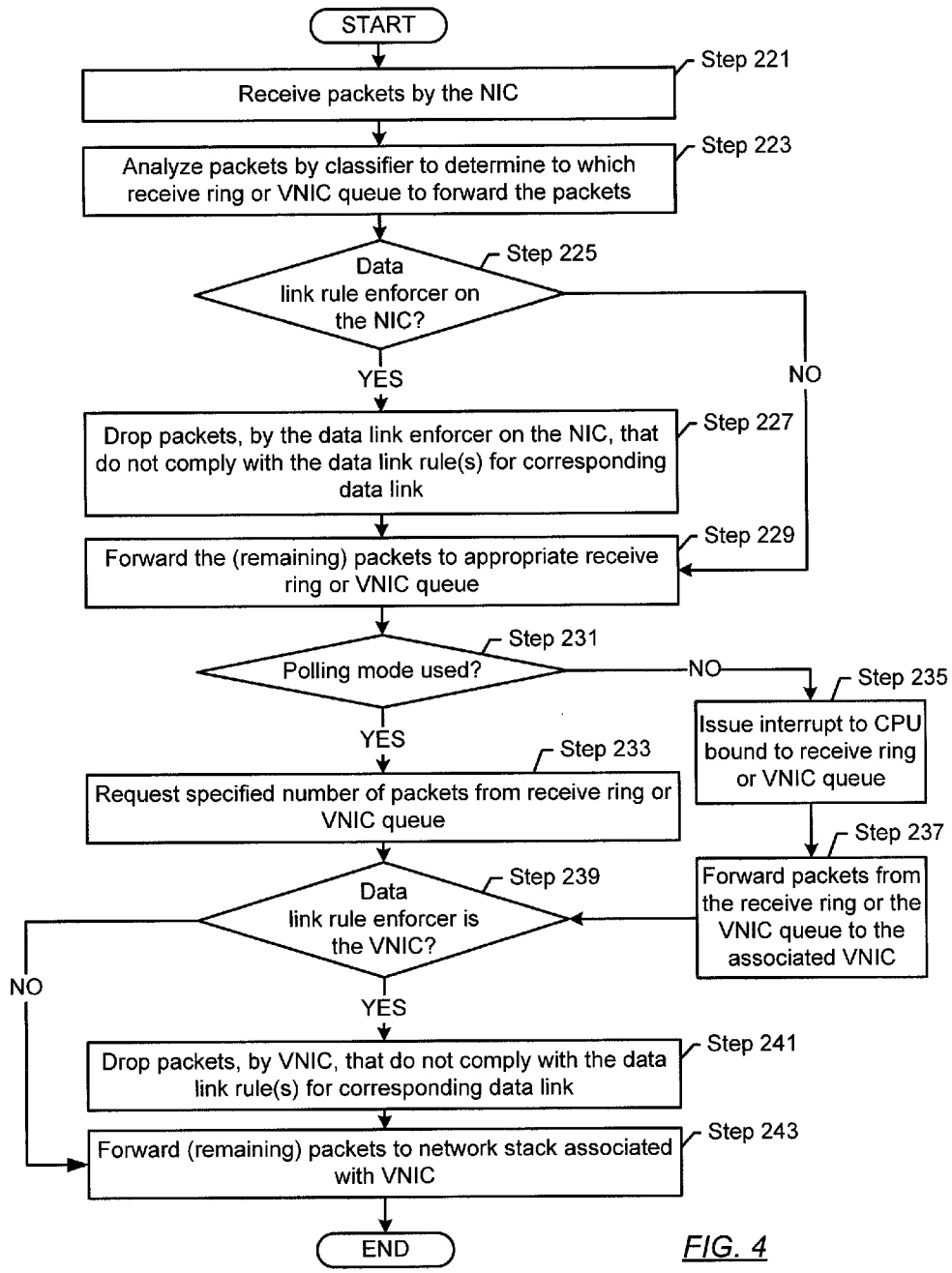
Figure 5:
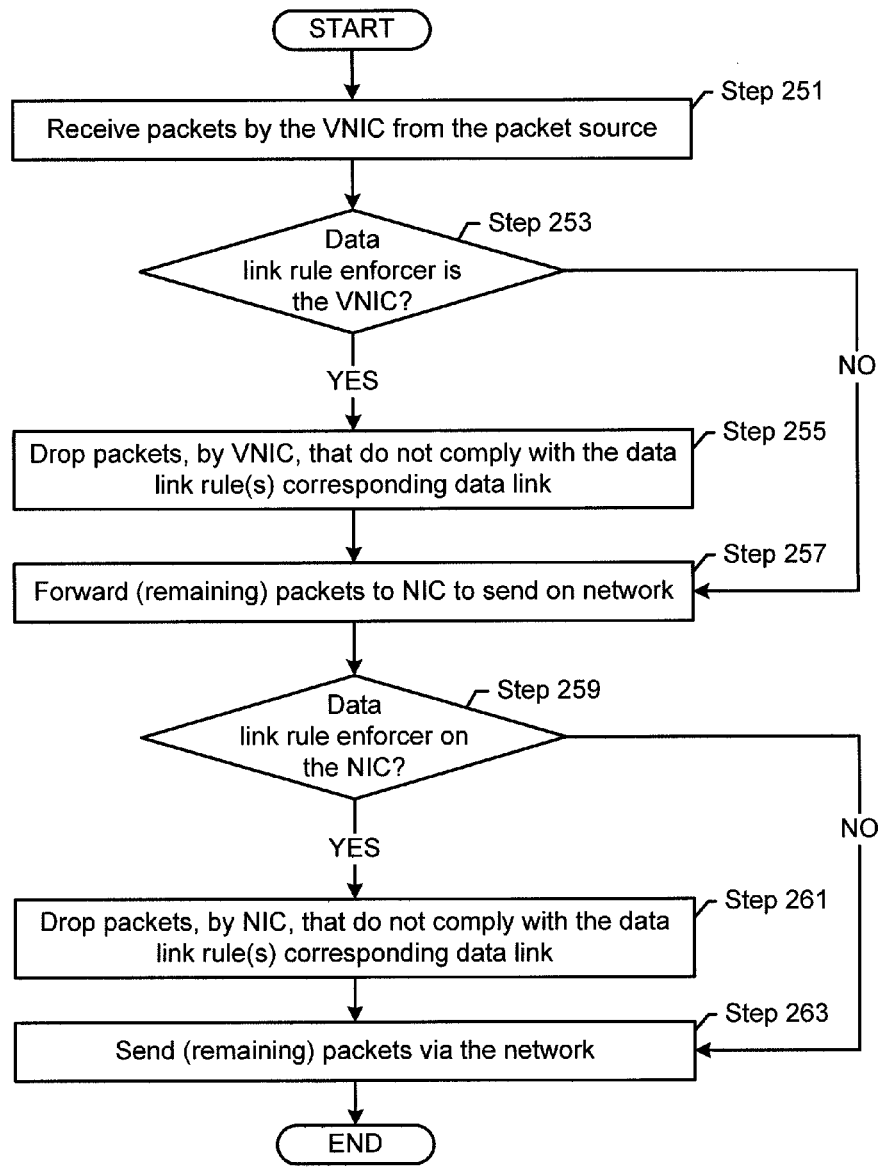

FIGS. 3-5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 3 shows a flowchart in accordance with one embodiment of the invention. In Step 201, a packet source/destination is created. The technique for creating the packet source/destination is dependent on the type of packet source/destination. Techniques known in the art may be used to create the packet source/destination.

In Step 203, at least one VNIC is created for the packet source/destination.

Specifically, at least one new instance of a VNIC is created for the packet source/destination. The new instance of the VNIC is assigned a MAC address. The MAC address may be set by an administrator, correspond to a random number, provided by the NIC, etc.

In Step 205, a virtual network stack is optionally created for the packet source/destination in accordance with one or more embodiments of the invention. Specifically, a virtual network stack is created for each VNIC created for the packet source/destination. As discussed above, if the packet source/destination corresponds to a virtual machine, then installing the operating system in the virtual machine may create a network stack for the packet source/destination in accordance with one or more embodiments of the invention. In such a scenario, an additional virtual network stack may not be required.

In Step 207, a hardware and/or software classifier is subsequently programmed so that network traffic for the VNIC created in Step 203 is directed to a particular receive ring by the hardware or software classifier in accordance with one or more embodiments of the invention.

In Step 209, data link rule(s) are generated for data link(s) connected to the packet source/destination. In one or more embodiments of the invention, generating the data link rules includes identifying security policies for packet traffic to and from the packet source/destination. Specifically, security policies relating to the type of packets that should and/or should not be received by the packet source/destination are identified. Similarly, security policies relating to the type of packets that should and/or should not be sent by the packet source/destination are identified. The security policies are used to create the data link rules. For example, a security policy may specify that packets sent by a packet source on a public network should not be allowed to impersonate other packet sources executing on the same host. Such security policy may be used to create a data link rule that specifies the MAC address of packets sent by the packet source on the public network must match the MAC address of the VNIC used to send the packets on the public network.

In Step 211, a determination is made whether to program a data link enforcer on the NIC to enforce the data link rule(s). If a determination is made to have the data link enforcer on the NIC perform the enforcement, then a data link enforcer on the NIC is programmed to enforce the data link rule(s). Specifically, the data link rules are sent to the data link enforcer on the NIC. On the NIC, the data link rules are associated with the receive ring corresponding to the data link to which the rule is applied. For example, the data link rules may be stored in a table that references the hardware receive ring. Alternatively, the data link rules may be stored in the hardware receive ring. Further, in one or more embodiments of the invention, the information in the data link rules may vary based on the type of data link rules. For example, a data link rule that is based on the MAC address of the VNIC connected to the receive ring may not explicitly include the MAC address because the MAC address is already associated with the receive ring. However, in another example, a data link rule that is based on the protocol or an IP address may be stored with in NIC in a location accessible to the data link rule enforcer.

Although not explicitly discussed above, a subset of the data link rules may be enforced by a data enforcer on the NIC while the remaining data link rules may be enforced in the MAC layer in accordance with one or more embodiments of the invention. In such embodiments, both data link enforcers may be programmed to enforce the data link rules.

In Step 215, a determination is made whether to enforce the data link rule(s) on the VNIC (or in the MAC layer). If the VNIC (or another process in the MAC layer) is the data link rule enforcer, then the VNIC (or another process in the MAC layer) is programmed to enforce the data link rules in Step 217. In one embodiment of the invention, for each data link rule, the VNIC corresponding to the data link rule is programmed with the data link rule. A VNIC corresponds to a data link rule when the data link rule specifies a filtering of the packets sent through the VNIC. Programming the VNIC may include storing the data link rule in a memory location accessible and referenced by the VNIC in accordance with one or more embodiments of the invention.

After the data link rule enforcer is programmed with data link rules, the data link rule enforcer may enforce the rules. The data link rule enforcer may be occasionally reprogrammed with new data link rules and data link rules may be removed from enforcement.

FIG. 4 shows a flowchart for enforcing data link rules in accordance with one embodiment of the invention. In Step 221, one or more packets are received by the NIC. Specifically, the NIC receives packets from the physical network. In Step 223, a classifier (either a hardware classifier residing in the NIC or a software classifier residing in the host operatively connected to the NIC) analyzes each packet and determines to which of the receive rings (if the classifier is a hardware classifier) or virtual NIC queues (if the classifier is a software classifier) to forward each of the packets.

In one or more embodiments of the invention, if the classifier is a hardware classifier on the NIC, then a determination is made whether the data link rule enforcer is on the NIC in Step 225. In Step 227, if the data link rule enforcer is on the NIC and performing the classifier for the receive rings, then the data link rule enforcer on the NIC drops packets that do not comply with the data link rule(s) for the data link corresponding to the packets. Specifically, for each receive ring, the data link rule enforcer analyzes the data in the packet (header data and/or packet load) and compares the data with the data link rules. In one or more embodiments of the invention, any packets that do not comply with the data link rules are dropped. Specifically, the packets that violate the data link rules are not forwarded to the host in accordance with one or more embodiments of the invention.

In Step 229, the (remaining) packets are subsequently forwarded to the appropriate receive ring (if the classifier is a hardware classifier) or virtual NIC queue (if the classifier is a software classifier) as determined by the classifier. At this stage, the processing of the packets differs depending on which mode the virtual serialization queue (which is bound to the receive ring or virtual NIC queue via the stack) is operating in. Specifically, the processing of the packets depends on whether the virtual serialization queue is operating in polling mode or interrupt mode in Step 231.

In one embodiment of the invention, the data link enforcer may analyze the packets after they are stored in the appropriate receive ring and remove any packets that do not satisfy the appropriate data link rule(s).

Continuing with FIG. 4, if the virtual serialization queue is operating in polling mode, then the packets remain in the receive ring or virtual NIC queue (depending on the implementation) until the VNIC requests all or a specified number of packets from the receive ring or virtual NIC queue in Step 233.

Those skilled in the art will appreciate that the receive rings and/or virtual NIC queues store a finite number of packets. Thus, if the receive rings and/or virtual NIC queues are receiving packets at a faster rate than the corresponding virtual serialization queue is requesting packets, the receive rings and/or virtual NIC queues fills with packets and packets received after this point are dropped until packets on the receive rings and/or virtual NIC queues are requested and processed.

Alternatively, if the virtual serialization queue is operating in interrupt mode, then an interrupt is issued to the CPU bound to the receive ring or virtual NIC queue in Step 235. When the interrupt is serviced, all packets in the receive ring or virtual NIC queue are forwarded to the VNIC in Step 237.

In Step 239, a determination is made whether the data link rule enforcer is the VNIC (or another process in the MAC layer). If the data link rule enforcer is the VNIC, then the VNIC drops packets that do not comply with the data link rule(s) associated with the data link in Step 241. Specifically, for each receive ring, the VNIC analyzes the data in the packet (header data and/or packet load) and compares the data with the data link rules. In one or more embodiments of the invention, any packets that do not comply with the data link rules are dropped. Specifically, the packets that violate the data link rules are not forwarded to the (virtual) network stack for the packet destination. If the data link rule enforcer is not the VNIC, then the process proceeds to Step 243.

In Step 243, the remaining packets are subsequently forwarded to the appropriate network stack associated with the VNIC. In one or more embodiments of the invention, after the packets are forwarded to the network stack, the packets are processed using network layer and transport layer processing. Accordingly, in one or more embodiments of the invention, if the packet destination is a virtual machine, then the enforcement of the security policies to ensure that the virtual machine is not performing malicious acts is not performed by the network stack executing in the virtual machine; rather, the enforcement is performed by the host or NIC.

FIG. 5 shows a flowchart for sending packets by a virtual machine in accordance with one or more embodiments of the invention. In Step 251, packets are received by the VNIC from the packet source. In one or more embodiments of the invention, when the packets are received by the VNIC, the packets have been processed through the network layer and transport layer.

In Step 253, a determination is made whether the data link rule enforcer is the VNIC. If the data link rule enforcer is the VNIC, then the VNIC drops packets that do not comply with the data link rule(s) associated with the data link in Step 255. Enforcing the data link rule(s) for packets to be sent on the network may be performed in a manner similar to enforcing rules for packets received from the network.

In Step 257, the (remaining) packets are subsequently forwarded to the NIC in accordance with one or more embodiments of the invention. In one or more embodiments of the invention, rather than sending the packets to the NIC to be sent on a network, the packets may be directed to another packet destination on the same host. In such scenario, the packets may be forwarded to a virtual switch on the host to send to the packet destination.

If the packets are forwarded to the NIC, a determination is made whether the data link rule enforcer is on the NIC in Step 259. In Step 261, if the data link rule enforcer is on the NIC, then the transmit ring corresponding to the VNIC is identified. The data link rule enforcer on the NIC drops packets that do not comply with the data link rule(s) corresponding to the transmit ring. The remaining packets may be stored in the transmit ring. The (remaining) packets are sent from the transmit ring via the network to their respective packet destinations in Step 263.

Figure 6:
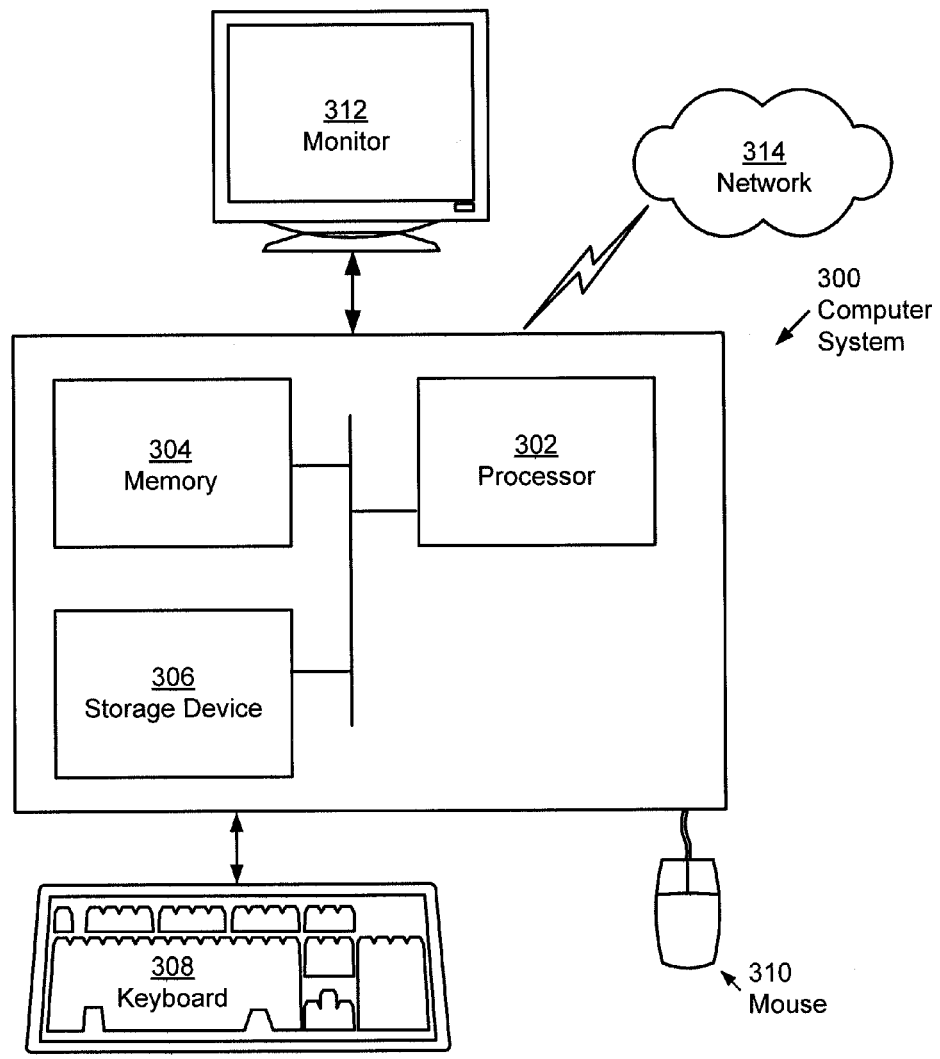
FIG. 6 shows a computer system in accordance with one or more embodiments of the invention.

Embodiments of the invention may be implemented on virtually any type of computer regardless of the platform being used. For example, as shown in FIG. 6, a computer system (300) includes one or more processor(s) (302), associated memory (304) (e.g., random access memory (RAM), cache memory, flash memory, etc.), a storage device (306) (e.g., a hard disk, an optical drive such as a compact disk drive or digital video disk (DVD) drive, a flash memory stick, etc.), and numerous other elements and functionalities typical of today's computers (not shown). The computer (300) may also include input means, such as a keyboard (308), a mouse (310), or a microphone (not shown). Further, the computer (300) may include output means, such as a monitor (312) (e.g., a liquid crystal display (LCD), a plasma display, or cathode ray tube (CRT) monitor). The computer system (300) may be connected to a network (314) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (300) includes at least the minimal processing, input, and/or output means necessary to practice embodiments of the invention. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising computer readable program code embodied therein for causing a computer system to:
   receive, by a virtual network interface card (VNIC) located in a media access control (MAC) layer of a host, a packet generated by a virtual machine comprising a network stack,
   wherein the VNIC and the virtual machine are both located on the host and the VNIC is external to the virtual machine, and
   wherein the packet is directed to a packet destination external to the host and connected to the host via a network;
   obtain a data link rule applying to a data link, wherein the data link is operatively connected to the virtual machine, and wherein the data link rule is a rule requiring an internet protocol (IP) address of the virtual machine that generated the packet to match a source IP address specified in the packet;
   determine, by the VNIC located on the host comprising the virtual machine that generated the packet, whether the packet complies with the data link rule before the packet is placed on the network connecting the host and the packet destination; and
   drop, by the VNIC located on the host comprising the virtual machine that generated the packet, the packet when the packet fails to comply with the data link rule before the packet is placed on the network.

2. The non-transitory computer readable medium of claim 1, wherein the data link rule further specifies a protocol that is allowed by the data link.

3. The non-transitory computer readable medium of claim 1, wherein the data link rule further specifies a protocol that is prohibited by the data link.

4. The non-transitory computer readable medium of claim 1, wherein the data link rule is defined for a plurality of data links operatively connected to the virtual machine and wherein the data link is one of the plurality of data links.

5. The non-transitory computer readable medium of claim 1, further comprising:
   sending, by the VNIC, the packet via the network when the packet complies with the data link rule.

6. The non-transitory computer readable medium of claim 1, wherein the data link rule further requires blocking of the packet when the packet corresponds to a control message for configuring the network.

7. A computer system comprising:
   a processor;
   a memory; and
   instructions stored in the memory for causing the processor to:
      receive, by a virtual network interface card (VNIC) located in a media access control (MAC) layer of a host, a packet generated by a virtual machine comprising a network stack,
      wherein the VNIC and the virtual machine are both located on the host and the VNIC is external to the virtual machine, and
      wherein the packet is directed to a packet destination external to the host and connected to the host via a network;
      obtain a data link rule applying to a data link, wherein the data link is operatively connected to the virtual machine, and wherein the data link rule is a rule requiring an internet protocol (IP) address of the virtual machine that generated the packet to match a source IP address specified in the packet;
      determine, by the VNIC located on the host comprising the virtual machine that generated the packet, whether the packet complies with the data link rule before the packet is placed on the network connecting the host and the packet destination; and
      drop, by the VNIC located on the host comprising the virtual machine that generated the packet, the packet when the packet fails to comply with the data link rule before the packet is placed on the network.

8. The computer system of claim 7, wherein the data link rule further requires blocking of the packet when the packet corresponds to a control message for configuring the network.

9. A method, comprising:
   receiving, by a virtual network interface card (VNIC) located in a media access control (MAC) layer of a host, a packet generated by a virtual machine comprising a network stack,
   wherein the VNIC and the virtual machine are both located on the host and the VNIC is external to the virtual machine, and
   wherein the packet is directed to a packet destination external to the host and connected to the host via a network;
   obtaining a data link rule applying to a data link, wherein the data link is operatively connected to the virtual machine, and wherein the data link rule is a rule requiring an internet protocol (IP) address of the virtual machine that generated the packet to match a source IP address specified in the packet;
   determining, by the VNIC located on the host comprising the virtual machine that generated the packet, whether the packet complies with the data link rule before the packet is placed on the network connecting the host and the packet destination; and
   dropping, by the VNIC located on the host comprising the virtual machine that generated the packet, the packet when the packet fails to comply with the data link rule before the packet is placed on the network.

10. The method of claim 9, wherein the data link rule further requires blocking of the packet when the packet corresponds to a control message for configuring the network.

* * * * *

UNITED STATES PATENT AND TRADEMARK OFFICE
CERTIFICATE OF CORRECTION

PATENT NO. : 9,059,965 B2  
APPLICATION NO. : 12/494910  
DATED : June 16, 2015  
INVENTOR(S) : Droux et al.

Page 1 of 1

It is certified that error appears in the above-identified patent and that said Letters Patent is hereby corrected as shown below:

In the Specification
In column 2, line 62, delete "nepharious" and insert -- nefarious --, therefor.

Signed and Sealed this
Twenty-eighth Day of June, 2016

Michelle K. Lee
*Director of the United States Patent and Trademark Office*